United States Patent [19]

Kovacs et al.

[11] 4,260,892
[45] Apr. 7, 1981

[54] GEIGER-MUELLER RADIATION DETECTOR WITH MEANS FOR DETECTING AND INDICATING THE EXISTENCE OF RADIATION OVERLOAD

[75] Inventors: Terrence Kovacs, North Plainfield; Allen P. Mills, Jr., New Providence; Loren N. Pfeiffer, Harding Township, Morris County, all of N.J.

[73] Assignee: Bell Telephone Laboratories, Incorporated, Murray Hill, N.J.

[21] Appl. No.: 68,604

[22] Filed: Aug. 22, 1979

[51] Int. Cl.³ .............................................. G01T 1/18
[52] U.S. Cl. .................................... 250/388; 250/374
[58] Field of Search ........................ 250/374, 375, 388

[56] References Cited

U.S. PATENT DOCUMENTS

| | | | |
|---|---|---|---|
| 2,963,588 | 12/1960 | Wilson | 250/388 |
| 2,982,857 | 5/1961 | Clarke | 250/388 |
| 3,366,791 | 1/1968 | Markow | 250/388 |

OTHER PUBLICATIONS

Melissinos, Experiments in Modern Physics, "Gaseous Ionization Instruments", Academic Press, pp. 175–177.

*Primary Examiner*—Davis L. Willis
*Attorney, Agent, or Firm*—Peter V. D. Wilde

[57] ABSTRACT

When subjected to radiation overload existing Geiger-Mueller counters may give an erroneously low reading, resulting in possible hazard to personnel. The instant invention discloses simple and inexpensive apparatus to remedy this dangerous shortcoming. Depending on the geometry of the detector tube, two possible failure modes have been identified, and circuitry is disclosed to detect the existence of these respective failure modes. The disclosed apparatus indicates the absence of an overload condition, in addition to signaling, by both visible and audible means, the existence of excessive radiation that might result in erroneously low reading of the Geiger-Mueller counter.

9 Claims, 4 Drawing Figures

GEIGER-MUELLER RADIATION DETECTOR WITH MEANS FOR DETECTING AND INDICATING THE EXISTENCE OF RADIATION OVERLOAD

BACKGROUND OF THE INVENTION

1. Field of the Invention

The invention is in the field of radiation detectors of the Geiger-Mueller type.

2. Description of the Prior Art

The Geiger-Mueller (G-M) counter is a simple and inexpensive detector for many species of ionizing radiation, such as x-rays, γ-rays, β-particles, and α-particles. Such an instrument typically consists of a gas-filled detector tube, a high voltage bias supply, and means for indicating the occurrence of an ionizing event within the detector tube, together with associated circuitry. For a general discussion of G-M counters see, for instance, A. C. Melisinos: *Experiments in Modern Physics*, Academic Press, 1966, pp. 175-177. Various types of detector tubes are in existence, but a very common design consists of a cylindrical chamber with a wire stretched along its axis. The chamber wall typically is grounded and acts as the negative electrode or cathode, whereas positive voltage is applied to the axial wire, the anode. The tube is filled with gas, such that ionizing radiation that enters the tube, typically through a "window", has a substantial probability of creating there one or more ion-electron pairs. Such an ionizing event we will call a "primary" event. If a sufficiently high voltage, of the order of one kilovolt, is applied to the anode then the free electrons that were created by a primary ionization event will be sufficiently accelerated towards the anode wire to produce secondary ion-electron pairs by collision, before eventually being collected at the anode. Similarly, the thus created secondary electrons can produce tertiary ion-electron pairs, and so on. For simplicity's sake, we refer to all non-primary ionization events as "secondary", and the products thereof as, e.g., "secondary electrons". If the tube is operated in the so-called "Geiger-Mueller regime" then a primary event will lead to substantial ionization of the volume of gas enclosed in the tube, and a discharge takes place. During the discharge the resistance between anode and cathode becomes negligible, and the tube acts essentially as a closed switch between the high voltage bias source and ground. The positive ions, being much more massive than electrons, require a substantial amount of time to drift to the cathode, where they eventually are neutralized, whereas the highly mobile electrons require only little time to reach the anode. External to the tube the discharge is observable as a current pulse having a short rise time, of the order of microseconds, and a long decay time, of the order of a millisecond. If a second primary ionization event should occur before all the ions produced as a consequence of a first primary event have been collected at the cathode then the resulting current pulse will be smaller than it would have been in the absence of the first event. This is so, inter alia, because the effective potential between anode and cathode is lowered by the presence of the positive ions. As long as primary events occur in sufficiently rapid succession the effective voltage between anode and cathode will not recover to the high level necessary for operation in the G-M regime, and the effective voltage may in fact become so low that substantially no pulses occur. In such a condition the G-M counter will appear to indicate a low or zero radiation level even though the detector tube is exposed to a high radiation level. It is obvious that such a condition would be a highly dangerous one for personnel relying on the G-M counter as an indicator of actual radiation levels present.

SUMMARY OF THE INVENTION

The invention provides simple and inexpensive means for detecting and indicating the existence of a radiation overload of the G-M counter. It thus remedies the above-mentioned shortcoming of existing G-M radiation detectors by indicating when a zero or low reading of the instrument is due to excessive radiation reaching the detector tube. By "overload" we mean a condition where the average time between primary events in the detector tube is shorter than the "dead-time" of the tube, i.e., the time required to substantially re-establish the full potential difference between anode and cathode after a primary event. A radiation level sufficient to cause such overload will be referred to as "excessive".

For most detector tube geometries overload failure occurs because of space charge saturation, i.e., establishment of a relatively stable region of positive space charge between anode and cathode, resulting in a lowered effective potential between the electrodes. In turn, this causes the individual breakdown pulses to have lower amplitudes than during operation of the instrument in the G-M regime. At extreme saturation the amplitude of the individual breakdown pulses becomes negligible, leaving substantially only a direct current flowing through the G-M tube. We refer to this failure mode as the "space charge" failure mode. To warn of this condition, the inventive method senses saturation by comparing the integrated total current through the G-M tube with the integrated rectified AC-component of that current. If the ratio of these two quantities exceeds a certain predetermined value warning devices are to be actuated to inform the operator of the existence of an overload and the resulting likelihood of a low reading of the G-M counter.

However, for some geometries of the detector tube a different failure mode is also possible. In particular, if anode and cathode are of comparable size then an overload can lead to the drawing of a relatively large current from the high voltage supply. This "excessive" curerent results in a lower applied potential across the tube, due to the existence of a substantial voltage drop across the internal impedance of the high voltage supply as well as across any series resistors present in the current path. This failure mode we term the "high voltage bias" failure mode. The occurrence of this condition can be easily detected by, for instance, monitoring the voltage across the G-M tube. If the voltage drops below a predetermined level warning devices are to be actuated in the same way as discussed above.

DETAILED DESCRIPTION

Figure 1:
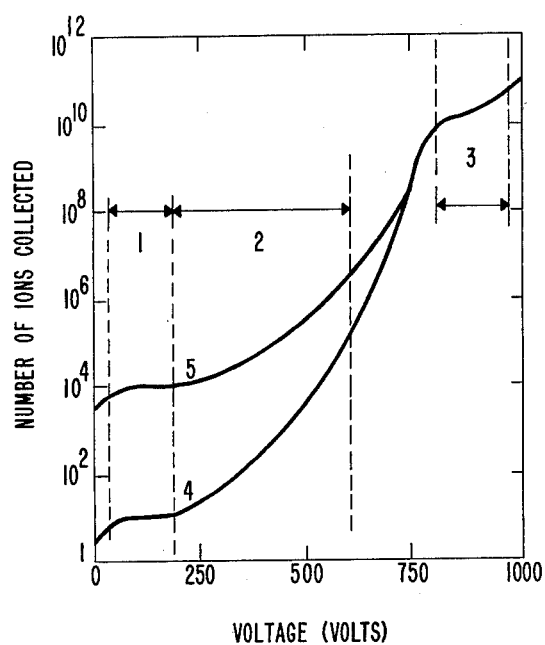
FIG. 1 shows typical plots of applied voltage versus the number of ions collected when energetic α- and β-particles traverse a typical Geiger-Mueller detector tube.

FIG. 1 shows typical plots of the number of electron-ion pairs collected when charged particles traverse a G-M detector tube of averge size, plotted against the voltage applied between the electrodes. Curve 4 is for energetic $\beta$-particles, which have relatively small ionizing power, whereas curve 5 refers to energetic $\alpha$-particles, heavily ionizing particles. Three regions can be easily distinguished in these plots: region 1, referred to as the "ionization chamber" regime, region 2, the so-called "proportional counter" regime, and region 3, the "Geiger-Mueller" regime. In this last regime, the number of ions collected is independent of the energy and species of particle responsible for the primary event. The number is also only relatively weakly dependent on applied voltage. As FIG. 1 indicates, multiplication of ion-electron pairs by a factor of the order of $10^6$ or more takes place when running the tube in the G-M regime, resulting in easily detectable current pulses.

Typically, G-M counters of the kind used in great numbers for radiation safety purposes in laboratories and industrial radiation installations have provisions to test for only one possible failure mode of the instrument, a "battery failure" test. Frequently, this test is done by switching the instrument into the test mode, and pressing a test button. The indicating means of the instrument will then show whether or not the battery voltage is still acceptable. However, as we have discussed above, it is possible for a G-M counter to give a zero or erroneously low reading despite a functioning battery, if the counter is operated in a radiation environment resulting in an overload condition. In the following, we describe the modifications carried out on a particular commercially available G-M radiation detector. It will be understood, however, that our invention is not limited to modifying this particular design of G-M detector, but rather is adaptable to any G-M detector that is subject to the described overload failure. Such adaptation would require only ordinary skill in electronics, and would be obvious to anyone skilled in the art.

Figure 2:
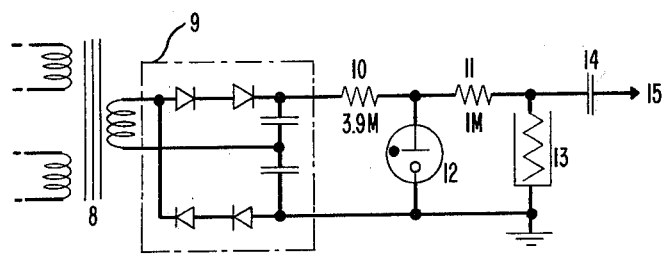
FIG. 2 shows schematically the typical high voltage circuitry of a prior-art Geiger-Mueller detector.

FIG. 2 shows the circuit diagram of the original high voltage portion of the G-M detector that was modified by us. The stepped-up voltage from transformer 8 is rectified and smoothed by a voltage doubler, enclosed within dashed line 9, and the resulting DC voltage is applied to the mode of the G-M probe 13. During normal operation of the counter the high voltage regulator tube 12 conducts about 35 microamperes to ground. DC is blocked by capacitor 14, whereas any pulses can pass to the pulse-counting circuitry following point 15 in the circuit.

Figure 3:
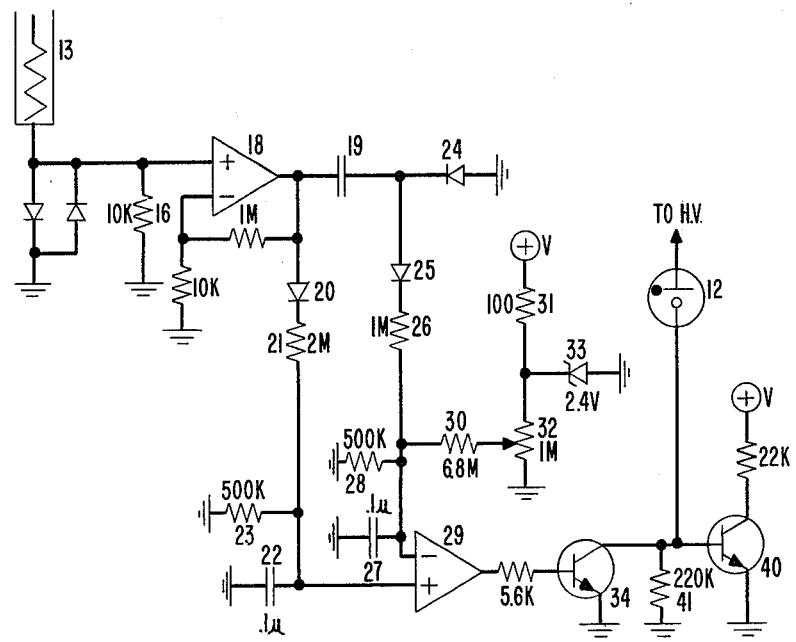
FIG. 3 primarily shows the circuitry used to detect the "space charge" failure mode of a Geiger-Mueller detector.

FIG. 3 shows the modifications and added circuitry used to detect the condition referred to as "space charge" failure, i.e., the saturation of the G-M tube due to space charge build-up. The onset of space charge saturation is characterized by a reduction in amplitude of the individual pulses. At extreme saturation, the individual breakdown pulses essentially disappear, leaving essentially only a direct current flowing through the G-M tube. The standard detector circuit however is not sensitive to DC. To warn of this condition, therefore, we sense space charge saturation by comparing the integrated total current through the G-M tube with the integrated rectified AC-component of that current. The total current through the G-M tube is monitored by means of resistor 16, with the voltage across 16 being applied to the non-inverting input terminal of DC-coupled amplifier 18. The output of amplifier 18 is connected through diode 20 and resistor 21 to an integrator consisting of resistor 23 and capacitor 22, which serves to integrate a voltage which is proportional to the total tube current. The AC component of the output of amplifier 18 is coupled through capacitor 19. Diode 24 removes the negative parts of the AC signal. The resulting rectified voltage is then connected through diode 25 and resistor 26 to the integrator consisting of resistor 28 and capacitor 27, which serves to integrate the voltage which is proportional to the AC component of the tube current. This integrated voltage is applied to the negative input of amplifier 29, whereas the voltage across capacitor 22, which is proportional to the total current through the G-M tube, is applied to the positive input of differential amplifier 29, which essentially acts as a comparator. The AC integrator is biased by resistors 30 and 31, potentiometer 32, and Zener diode 33, such that in the absence of primary events in the G-M tube the output of amplifier 29 is low, thereby reverse biasing transistor 34. During normal operation of the G-M tube, the integrations of the total G-M current and of the AC component of that current yield essentially the same result, which results in continued low output of amplifier 29. As the G-M pulses begin to disappear during saturation the result of the AC integration will fall below that of the integration of the total current, and the output of amplifier 29 will go high, thereby forward biasing transistor 34, which pulls the base of transistor 40 to near ground. For our purposes, this condition constitutes detection of the failure mode.

Figure 4:
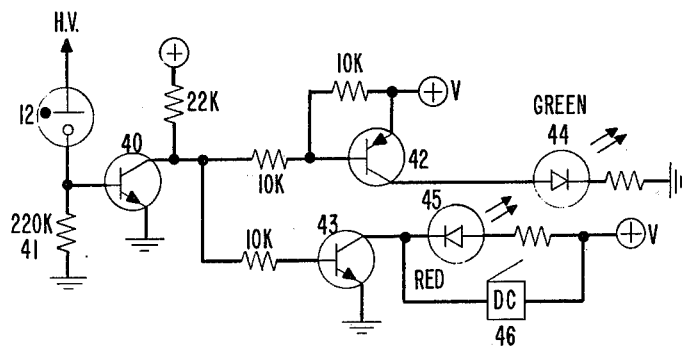
FIG. 4 shows the circuitry used to detect the "high voltage bias" failure mode of the Geiger-Mueller detector, as well as the circuitry used to indicate the existence of an overload.

FIG. 4 shows the modifications and added circuitry we use to detect the existence of "high voltage bias" failure. It also shows the additional circuitry used to indicate the existence of an overload condition, which indicating means are the same for either failure mode. In our modification of the existing G-M counter, we installed a resistor 41 between the cathode of the high voltage regulator tube 12 and ground. During normal operation, regulator tube 12 is conducting to ground through resistor 41, and transistor 40 is therefore forward biased. The collector of transistor 40 is near ground, which forward biases transistor 42 and reverse biases transistor 43, holding the green light emitting diode (LED) 44 ON, and the red LED 45 OFF. If the high voltage falls below about 960 volts the regulator tube 12 stops conducting, causing transistor 40 to turn off. Consequently, transistor 42 and the green LED 44 switch to OFF, and transistor 43, the red LED 45, and the warning buzzer 46 switch to ON. The same sequence of events occurs if the "space charge" failure mode has been detected, i.e., if the base of transistor 40 has been pulled to near ground because the output of amplifier/comparator 29 in FIG. 3 has gone high. In the preferred embodiment disclosed herein amplifiers 18 and 29 were $\frac{1}{4}$ each of a LM324 integrated operational amplifier, and buzzer 46 was a Panasonic electronic buzzer EAL-030B. However, many equivalent components exist that could be used instead.

The modifications of the existing G-M counter disclosed by us here result in operation of the failure indicating means that are essentially probe-independent and independent of the meter scale selected. The described radiation overload circuitry operates with battery supply voltages between 3.2 and 5 volts, comfortably spanning the 4.0 to 4.5 volt "battery OK" test range of the meter modified by us. Normal operation and meter calibration is not affected by the addition of this overload monitor circuitry. In addition to indicating the existence of normal as well as excessive radiation levels, the described modification indicates to the operator the existence of some kinds of circuit failure if both LEDs are simultaneously OFF. Our invention thus significantly improves the information that can be derived from a G-M counter, remedies a serious safety shortcoming of the common G-M survey meter, and does all this with very simple and inexpensive components and circuits. However, our invention is not restricted to the particular means for implementing it that we have disclosed herein, since the basic objective of warning the operator of a G-M counter of the existence of a dangerously high radiation level can be obtained in many different ways, as would be obvious to anyone skilled in the art. For instance, one might provide a G-M counter with an auxiliary detector tube that is not subject to the overload failure the G-M tube is subject to, by operating it at a voltage lower than that required for operation in the G-M regime, and use its output to trigger warning means. Also, a possible variant of the preferred embodiment is the use of optical coupling in the detection of an overload. More specifically, by inserting a light-emitting diode between resistor 11 (FIG. 2) and the anode of G-M tube 13, one obtains an optical signal that is related to the total tube current. This signal can be received by, e.g., a phototransistor, and then processed as described above. In practice, the coupling would probably be accomplished by an opto-isolator.

We claim:

1. A radiation detector of the Geiger-Mueller type comprising
   (a) a sealed detector tube having an anode and a cathode, and containing ionizable gas,
   (b) detector means for detecting the existence of an overload condition of the radiation detector due to excessive radiation reaching the detector tube, and
   (c) indicating means for indicating the detection of such overload condition,
   characterized in that
   (d) the detector means comprises AC-detector means for detecting the existence of an AC-component of the current between the anode and the cathode that is smaller than a predetermined fraction of the total current between the anode and the cathode, thereby indicating the existence of "space charge failure" of the radiation detector.

2. Apparatus according to claim 1, wherein the AC-detector means comprises amplifier means arranged to compare a voltage proportional to the total current between the anode and the cathode with a voltage proportional to the rectified alternating current between the anode and the cathode.

3. A radiation detector of the Geiger-Mueller type comprising
   (a) a sealed detector tube having an anode and a cathode, and containing ionizable gas,
   (b) detector means for detecting the existence of an overload condition of the radiation detector due to excessive radiation reaching the detector tube,
   (c) indicating means for indicating the detection of such overload condition; and
   (d) circuit means for applying a bias voltage between the anode and the cathode,
   characterized in that
   (e) the detector means comprises DC-detector means for detecting the existence of a decrease in the bias voltage below a predetermined value due to excessive current between anode and cathode, thereby indicating the existence of "high voltage bias failure" of the radiation detector.

4. Apparatus according to claim 3 wherein the detector means additionally comprises AC-detector means for detecting the existence of an AC-component of the current between the anode and the cathode that is smaller than a predetermined fraction of the total current between the anode and the cathode.

5. Apparatus according to claim 4, wherein the indicating means comprise optical means.

6. Apparatus according to claim 5, wherein the optical means are arranged to indicate also the absence of an overload condition.

7. Apparatus according to claims 1 or 3, wherein the indicating means comprise optical means.

8. Apparatus according to claim 7, wherein the optical means are arranged to indicate also the absence of an overload condition.

9. Apparatus according to claims 1 or 4 wherein the AC-detector means comprises
   (a) first integrator means for integrating a voltage that is proportional to the total current between the anode and the cathode,
   (b) second integrator means for integrating a voltage that is proportional to the AC-component of the total current,
   (c) comparator means for comparing the amplitudes of the output of the first and second integrator means, and the indicating means comprises
   (d) means responsive to the output of the comparator means.

* * * * *

UNITED STATES PATENT AND TRADEMARK OFFICE
CERTIFICATE OF CORRECTION

PATENT NO. : 4,260,892

DATED : April 7, 1981

INVENTOR(S) : Terrence Kovacs, Allen P. Mills, Jr. and Loren N. Pfeiffer

It is certified that error appears in the above—identified patent and that said Letters Patent is hereby corrected as shown below:

Column 1, line 20, "Melisinos" should read --Melissinos--.
Column 3, line 51, "mode" should read --anode--.

Signed and Sealed this

Twenty-seventh Day of October 1981

[SEAL]

Attest:

GERALD J. MOSSINGHOFF

Attesting Officer

Commissioner of Patents and Trademarks